(12) United States Patent
Zinniel

(10) Patent No.: US 8,075,300 B2
(45) Date of Patent: Dec. 13, 2011

(54) VAPOR SMOOTHING SURFACE FINISHING SYSTEM

(75) Inventor: Robert L. Zinniel, Plymouth, MN (US)

(73) Assignee: Stratasys, Inc., Eden Prairie, MN (US)

( * ) Notice: Subject to any disclaimer, the term of this patent is extended or adjusted under 35 U.S.C. 154(b) by 424 days.

(21) Appl. No.: 12/215,929

(22) Filed: Jun. 30, 2008

(65) Prior Publication Data

US 2009/0321972 A1 Dec. 31, 2009

(51) Int. Cl.
*B29C 71/00* (2006.01)

(52) U.S. Cl. .................. 425/445; 34/62; 34/145; 34/73; 34/78; 38/77.8; 38/77.83; 38/77.82

(58) Field of Classification Search .............. 34/62–66, 34/145, 73, 78; 38/77.8, 77.83, 77.82
See application file for complete search history.

(56) References Cited

U.S. PATENT DOCUMENTS

| | | | |
|---|---|---|---|
| 2,189,985 A | 2/1940 | Hickok | |
| 2,651,811 A | 9/1953 | Coney | |
| 3,020,661 A | 2/1962 | Miller et al. | |
| 3,437,727 A | 4/1969 | Boyhan et al. | |
| 3,737,499 A | 6/1973 | Kamena | |
| 3,807,054 A | 4/1974 | Joseph et al. | |
| 4,260,873 A | 4/1981 | Simmons | |
| 4,529,563 A | 7/1985 | McGinniss | |
| 4,594,311 A | 6/1986 | Frisch et al. | |
| 4,976,813 A | 12/1990 | Salensky et al. | |
| 4,999,069 A | 3/1991 | Brackett et al. | |
| 5,039,472 A | 8/1991 | Salensky et al. | |
| 5,045,141 A | 9/1991 | Salensky et al. | |
| 5,059,359 A | 10/1991 | Hull et al. | |
| 5,073,231 A | 12/1991 | Eschwey et al. | |
| 5,121,329 A | 6/1992 | Crump | |
| 5,143,663 A | 9/1992 | Leyden et al. | |
| 5,448,838 A | 9/1995 | Edmonds | |
| 5,587,913 A | 12/1996 | Abrams et al. | |
| 5,647,143 A * | 7/1997 | Kubota et al. ................... | 34/410 |
| 5,732,323 A | 3/1998 | Nyrhila | |
| 5,945,016 A * | 8/1999 | Cormack ...................... | 219/393 |

(Continued)

FOREIGN PATENT DOCUMENTS

GB 1314711 4/1973

(Continued)

OTHER PUBLICATIONS

International Search Report and Written Opinion of PCT/US05/36581 filed Oct. 13, 2005.

(Continued)

*Primary Examiner* — Christina Johnson
*Assistant Examiner* — Xue Liu
(74) *Attorney, Agent, or Firm* — Brian R. Morrison; Westman, Champlin & Kelly, P.A.

(57) ABSTRACT

A system and method is provided for vapor smoothing a rapid manufactured three-dimensional object. A cabinet housing has a sealable interior. A heated vapor chamber in the interior of the cabinet housing contains solvent that is vaporizable to fill the vapor chamber with vapor for smoothing the object when the object is placed in the vapor chamber. A drying chamber is also provided in the interior of the cabinet housing that is separate from the vapor chamber for drying the object when the object is moved from the vapor chamber to the drying chamber.

20 Claims, 6 Drawing Sheets

U.S. PATENT DOCUMENTS

| | | | |
|---|---|---|---|
| 5,950,328 A * | 9/1999 | Ichiko et al. | 34/364 |
| 5,976,339 A | 11/1999 | André, Sr. | |
| 6,021,358 A | 2/2000 | Sachs | |
| 6,022,207 A | 2/2000 | Dahlin et al. | |
| 6,026,588 A * | 2/2000 | Clark et al. | 34/77 |
| 6,119,567 A | 9/2000 | Schindler et al. | |
| 6,175,422 B1 | 1/2001 | Penn et al. | |
| 6,210,719 B1 * | 4/2001 | de Lang et al. | 426/41 |
| 6,324,438 B1 | 11/2001 | Cormier et al. | |
| 6,490,496 B1 | 12/2002 | Dacey | |
| 6,572,807 B1 | 6/2003 | Fong | |
| 6,660,209 B2 | 12/2003 | Leyden et al. | |
| 6,722,872 B1 | 4/2004 | Swanson et al. | |
| 6,836,699 B2 | 12/2004 | Lukis et al. | |
| 6,898,477 B2 | 5/2005 | Loughran | |
| 2001/0023418 A1 | 9/2001 | Suzuki et al. | |
| 2002/0010526 A1 | 1/2002 | Ando et al. | |
| 2003/0035917 A1 | 2/2003 | Hyman | |
| 2003/0090752 A1 | 5/2003 | Rosenberger et al. | |
| 2005/0173838 A1 | 8/2005 | Priedeman, Jr. et al. | |

FOREIGN PATENT DOCUMENTS

| | | |
|---|---|---|
| JP | 50-026870 A | 3/1975 |
| JP | 6128398 | 5/1994 |
| WO | 2007044007 A | 4/2007 |

OTHER PUBLICATIONS

Detrex Corporation Brochure for Model VI-2000, Detrex Electric or Steam Heated Two Dip Vapor/Immersion Degreaser (2 pages), publicly available at least as of 1997.

Detrex Corporation Brochure for Model VS-2000, Detrex Electric or Steam Heated Vapor/Spray Degreaser (2 pages), publicly available at least as of 1997.

Detrex Corporation Brochure for VIBRA Degreasers (2 pages), publicly available at least as of Feb. 7, 2002.

Detrex Corporation Brochure for MBW-MINI Compact Cleaning System (2 pages), publicly available at least as of Feb. 7, 2002.

Detrex Corporation Brochure for MCS 2000 Cleaning System (2 pages), publicly available at least as of Feb. 7, 2002.

Detrex Corporation Brochure for Model MLW Modular Lift Washer (2 pages), publicly available at least as of Feb. 7, 2002.

Detrex Corporation Brochure for Model CBW Multi-Stage Cabinetized Rotating Basket Washer (2 pages), publicly available at least as of Feb. 7, 2002.

Detrex Corporation Brochure for MBW Industrial Washer Modular Conveyor Cleaning System (2 pages), Copyright 2000.

Detrex Corporation Brochure for Model AQD the Modular Aqueous Cleaning System (4 pages), publicly available at least as of 1996.

Detrex Corporation Brochure for Clean Vap Recirculating Hot Water Parts Cleaning System (2 pages), publicly available at least as of Feb. 7, 2002.

Detrex Corporation Brochure for Model MR Series (2 pages), publicly available at least as of Feb. 7, 2002.

Detrex Corporation Brochure for Solvent Vapor Recovery Systems (2 pages), publicly available at least as of Feb. 7, 2002.

International Search Report of Counterpart Application No. PCT/US2009/048357 Filed on Jun. 24, 2009.

* cited by examiner

US 8,075,300 B2

VAPOR SMOOTHING SURFACE FINISHING SYSTEM

BACKGROUND

The present invention relates to a system and method for surface finishing of rapid-manufactured three-dimensional (3D) objects by vapor smoothing.

The production and testing of 3D objects is commonly used for developing new products, machines, and processes in a wide range of industries. There are a variety of rapid manufacturing techniques for building 3D objects, each of which develop the objects from geometric computer models under computer control. These techniques generally slice or divide a digital representation of a desired object (e.g., a computer aided design (CAD)) into horizontal layers, then build the object layer-by-layer by repetitive application of materials. The term "rapid manufacturing" herein refers to the building of 3D objects by one or more layer-based additive techniques. Exemplary rapid manufacturing techniques include fused deposition modeling, ink jetting, selective laser sintering, and stereolithographic processes.

3D objects built by rapid manufacturing techniques generally exhibit "stair-step" appearances, particularly at curved or angled exterior surfaces. The stair stepping effect is caused by the layering of cross-sectional shapes that have square-edge profiles, and is more pronounced as layer thicknesses increase. While the stair stepping effect generally does not affect the strengths of the 3D objects, it may significantly diminish the desired aesthetic qualities. A variety of polishing techniques have been used to improve the surface finish of rapid-manufactured 3D objects. However, there is an ongoing need for surface treatment techniques that provide aesthetically pleasing surfaces to rapid-manufactured 3D objects.

SUMMARY

The present invention is a system and method for vapor smoothing a rapid manufactured three-dimensional object. The system includes a cabinet housing having a sealable interior. A heated vapor chamber in the interior of the cabinet housing contains solvent that is vaporizable to fill the vapor chamber with vapor for smoothing the object when the object is placed in the vapor chamber. A drying chamber is also provided in the interior of the cabinet housing that is separate from the vapor chamber for drying the object when the object is moved from the vapor chamber to the drying chamber.

The method involves heating a solvent in a vapor chamber to fill the vapor chamber with solvent vapor. The object is placed in the vapor chamber for a time sufficient to at least partially reflow material at a surface of the object. The object is then removed from the vapor chamber and placed in a drying chamber that is separate from the vapor chamber for a time sufficient to dry the surface of the object.

DETAILED DESCRIPTION

The system and method of the present invention may be employed with respect to objects formed from a polymeric or wax material using layered manufacturing rapid prototyping techniques. An exemplary layered manufacturing technique is the type disclosed in U.S. Pat. No. 5,121,329, wherein an extrusion head deposits "roads" of molten material in layers of predetermined shape, and which material solidifies upon a drop in temperature to form a solid model. The effect of surface finishing of such objects by vapor smoothing is explained in U.S. Patent Publication No. 2005/0173838, the disclosure of which is hereby incorporated by reference in its entirety.

Figure 1:
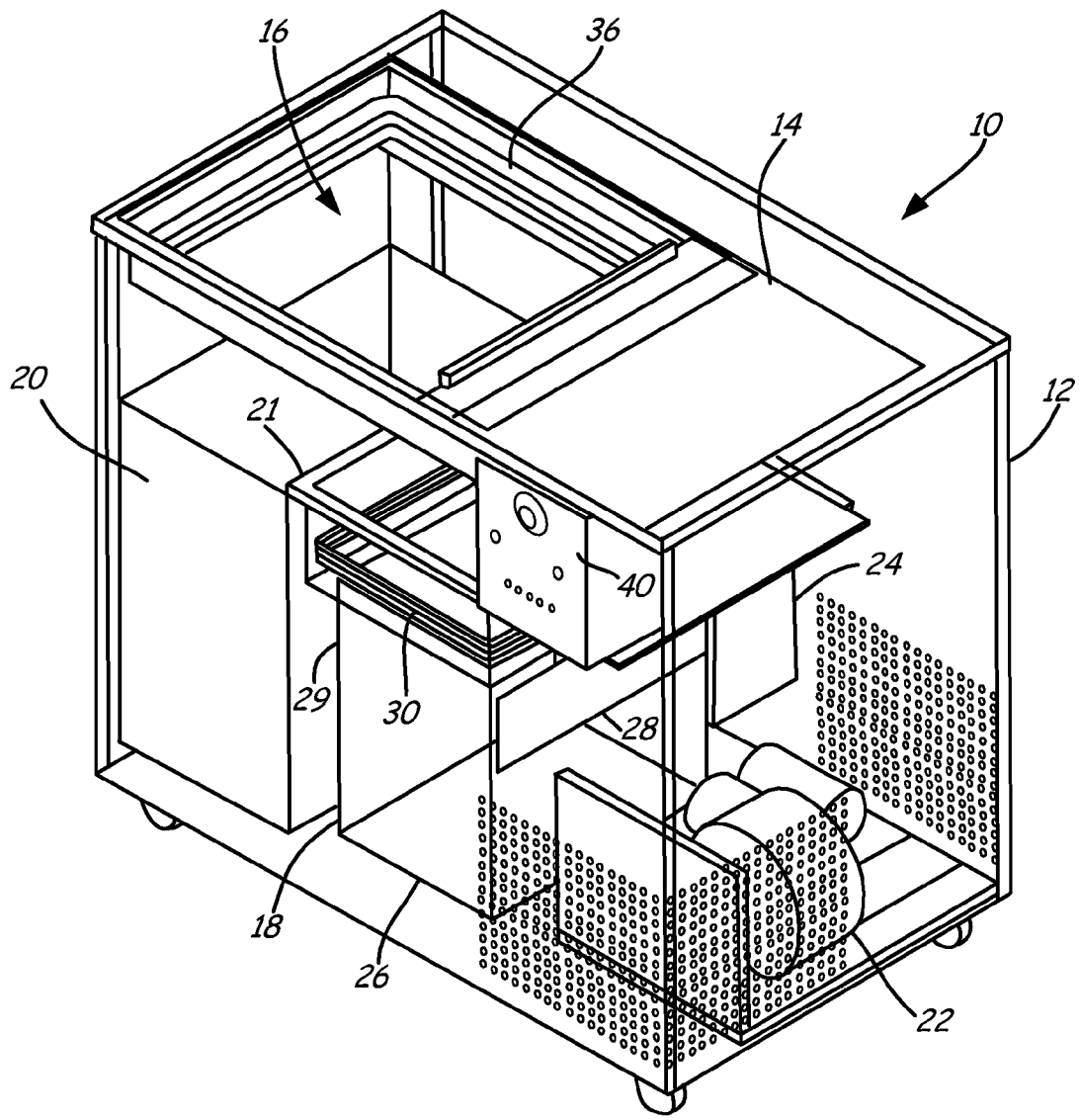
FIG. 1 is a perspective view illustrating a vapor smoothing surface finishing system according to an embodiment of the present invention.
Figure 2:
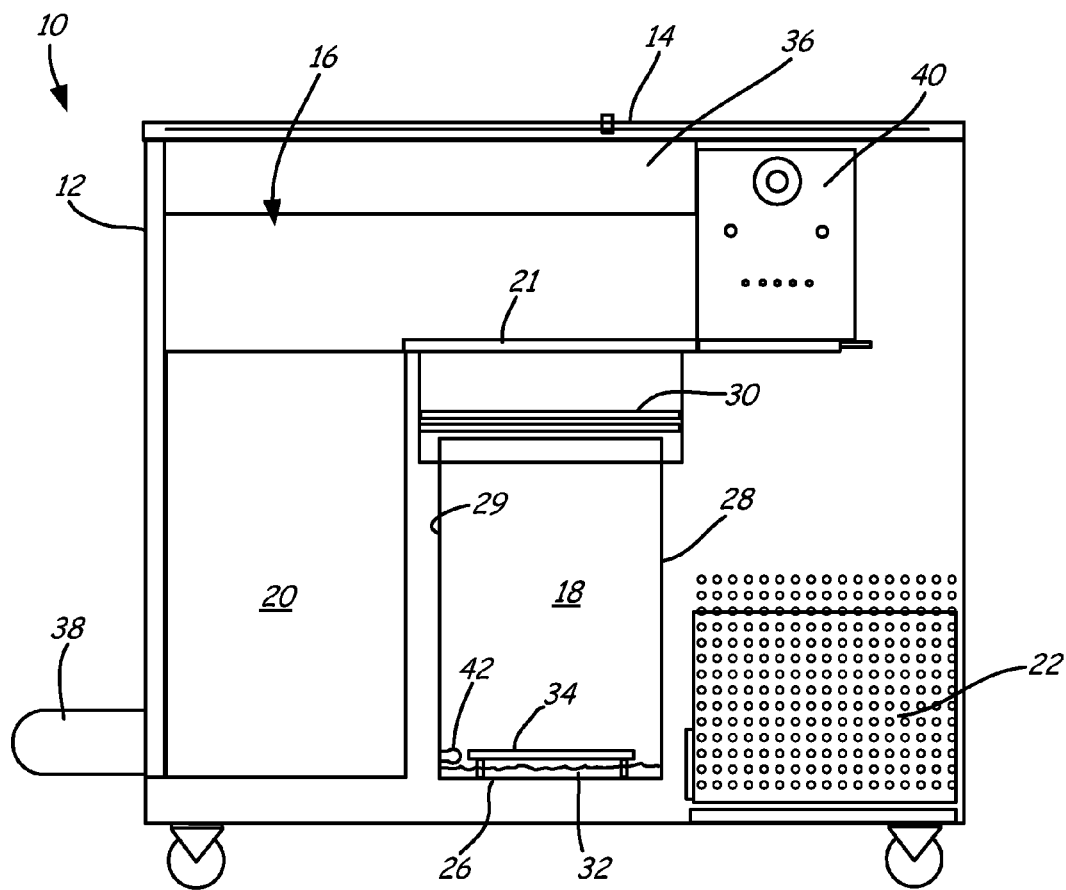
FIG. 2 is a front view illustrating a vapor smoothing surface finishing system according to an embodiment of the present invention.
Figure 3:
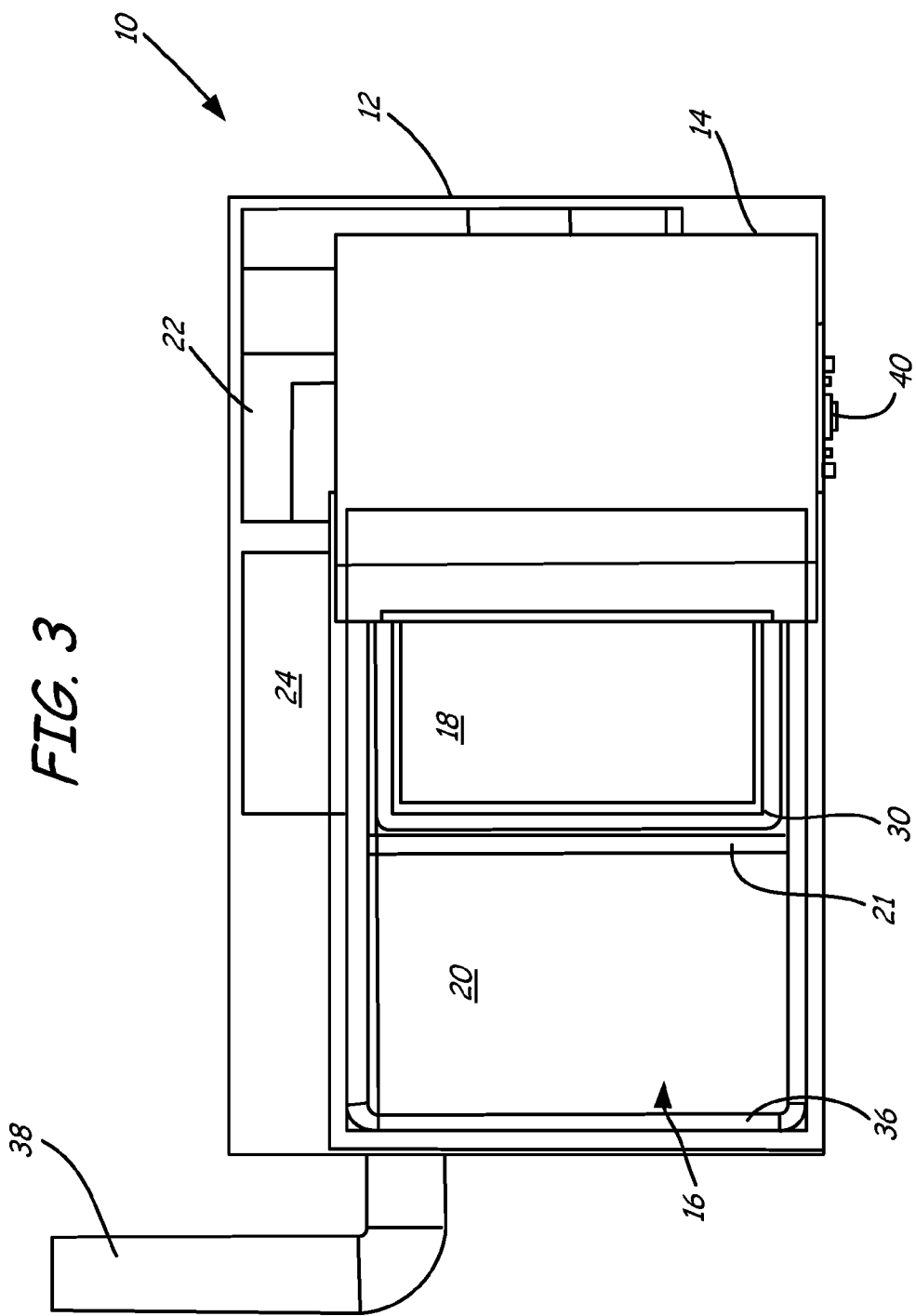
FIG. 3 is a top view illustrating a vapor smoothing surface finishing system according to an embodiment of the present invention.

FIG. 1 is a perspective view, FIG. 2 is a front view, and FIG. 3 is a top view, illustrating vapor smoothing surface finishing system 10 according to an embodiment of the present invention. System 10 includes cabinet housing 12, sliding door 14, cabinet interior 16, vapor chamber 18 and drying chamber 20. Sliding door 21 is provided to selectively cover vapor chamber 18. Refrigeration compressor 22 is also located in cabinet housing 12. Solvent storage tank 24 is located in cabinet housing 12 outside vapor chamber 18, and is connected via a valve (such as a ball valve in one embodiment) to the interior of vapor chamber 18. Sliding door 14 is operable to selectively open and close over cabinet interior 16, and may be operated either manually or by an automatic control.

Vapor chamber 18 includes bottom heater 26 and side heaters 28 and 29. Primary cooling coils 30 are connected to refrigeration compressor 22, and are located near the top of vapor chamber 18 to create a vapor ceiling for containing vapor in vapor chamber 18. In order to operate vapor chamber 18 for vapor smoothing an object, solvent 32 is provided at the bottom of vapor chamber 18. In an alternative embodiment, solvent 32 may be boiled in an area that is located off to the side of vapor chamber 18, rather than directly in the bottom of vapor chamber 18. Solvent 32 has a fluid level that is lower than the elevation of plate 34, so that any object that may be inadvertently dropped inside vapor chamber 18 does not fall into solvent 32. Alternatively, plate 34 may be deleted if dropping objects into solvent 32 is not a concern. In a particular embodiment, solvent 32 is maintained at a level between 0.25 and 0.5 inches (0.63 and 1.27 centimeters) across the bottom of vapor chamber 18, as this level is the minimum level of solvent required in such an embodiment to fill the interior of vapor chamber 18 with solvent vapor when boiled. Typical degreasing systems employ a large amount of solvent to fill the exposure chamber with vapor. However, use of the minimum amount of solvent required to fill vapor chamber 18 with vapor (achieved by continually providing solvent from solvent tank 24 to maintain the fluid level of solvent in vapor chamber 18 at this amount) allows surface finishing system 10 to start up and shut down more quickly, and avoids the use of a "boiling cauldron" of solvent that can be unsettling for an operator to work with. As used herein, the term "minimum amount" of solvent needed to fill the chamber with vapor includes some variability, and encompasses a range of solvent volumes that are effective to fill the vapor chamber with vapor without excess solvent in vapor chamber 18. Heaters 26, 28 and 29 are operated to form a vapor from solvent 32 in vapor chamber 18, which fills vapor chamber 18 below the vapor ceiling formed by primary cooling coils 30. Solvent 32 is selected to be compatible with the modeling material which forms the object to which surface finishing is to be applied, as is known in the art. For example, suitable solvents may include an n-Propyl bromide solution (e.g., Abzol®), perchloroethylene, trichloroethylene, hydrofluorocarbon fluid (e.g., Vertrel®), methylene chloride, or others.

Drying chamber 20 is located within cabinet housing interior 16 adjacent to vapor chamber 18. Drying chamber 20 is provided to allow an object that has been exposed to vapor in vapor chamber 18 to outgas for a period of time until the object is ready for either another exposure in vapor chamber 18 or removal from system 10. Drying chamber 20 is typically maintained at a temperature below room temperature, such as at or below about 50° F. (10° C.) in one embodiment. The difference between the temperature of the solvent vapor (e.g., about 106° F. (41° C.) for Vertrel® solvent) and the temperature of drying chamber 20 is preferably large, such as a difference of 40° F. (22° C.) or greater, in most embodiments. This ensures that the reaction of the solvent vapor to the material of the object is consistent and controlled.

In operation, an object to be subjected to surface finishing treatment is suspended in vapor chamber 18 in order to be smoothed by exposure to the vapor therein. An operator opens sliding door 14 to open interior 16 of system 10, and operates a control to open sliding door 21 to open vapor chamber 18. The operator then suspends the object, such as from a metal wire or another suspension mechanism, in vapor chamber 18, and the object is exposed to the vapor in vapor chamber 18 for a period of time sufficient to alter the surface finish of the object. Penetration of the vaporized solvent in vapor chamber 18 of the surface of the object softens the modeling material at the surface of the object, so that the surface material may reflow and thereby smooth the surface of the object. In one embodiment, the exposure time may be selected by observing condensation of solvent vapors on the object, and the object may be removed from vapor chamber 18 when condensation stops, indicating that the temperature of the object surface has reached the temperature of the boiling solvent. In another embodiment, the exposure time may be controlled according to a formula for the type of solvent and modeling material employed. Typical exposure times in vapor chamber are expected to be less than a few minutes, such as about 15-30 seconds in some embodiments.

After the object has been exposed in vapor chamber 18, the object is raised out of vapor chamber 18 and moved to drying chamber 20. When the object is removed from vapor chamber 18, it is preferable to cover vapor chamber with sliding door 21, as a precaution to ensure that no further vapors escape vapor chamber 18. The object may be suspended in drying chamber for as long as is necessary to dry and re-harden the surface of the object. Secondary cooling coils 36 are connected to refrigeration compressor 22, and are provided near the top of cabinet housing 12 to cool drying chamber to a desired temperature (typically below room temperature, as discussed above), and to ensure that all vapors are contained within cabinet housing 12. Exhaust vent 38 is optionally provided to operate when an object is located in drying chamber 20 (that is, when sliding door 21 covers vapor chamber 18) to provide ventilation outside of cabinet housing 12. Control panel 40 allows an operator to control start-up and shutdown of system 10, and provides system status indicators.

Figure 4:
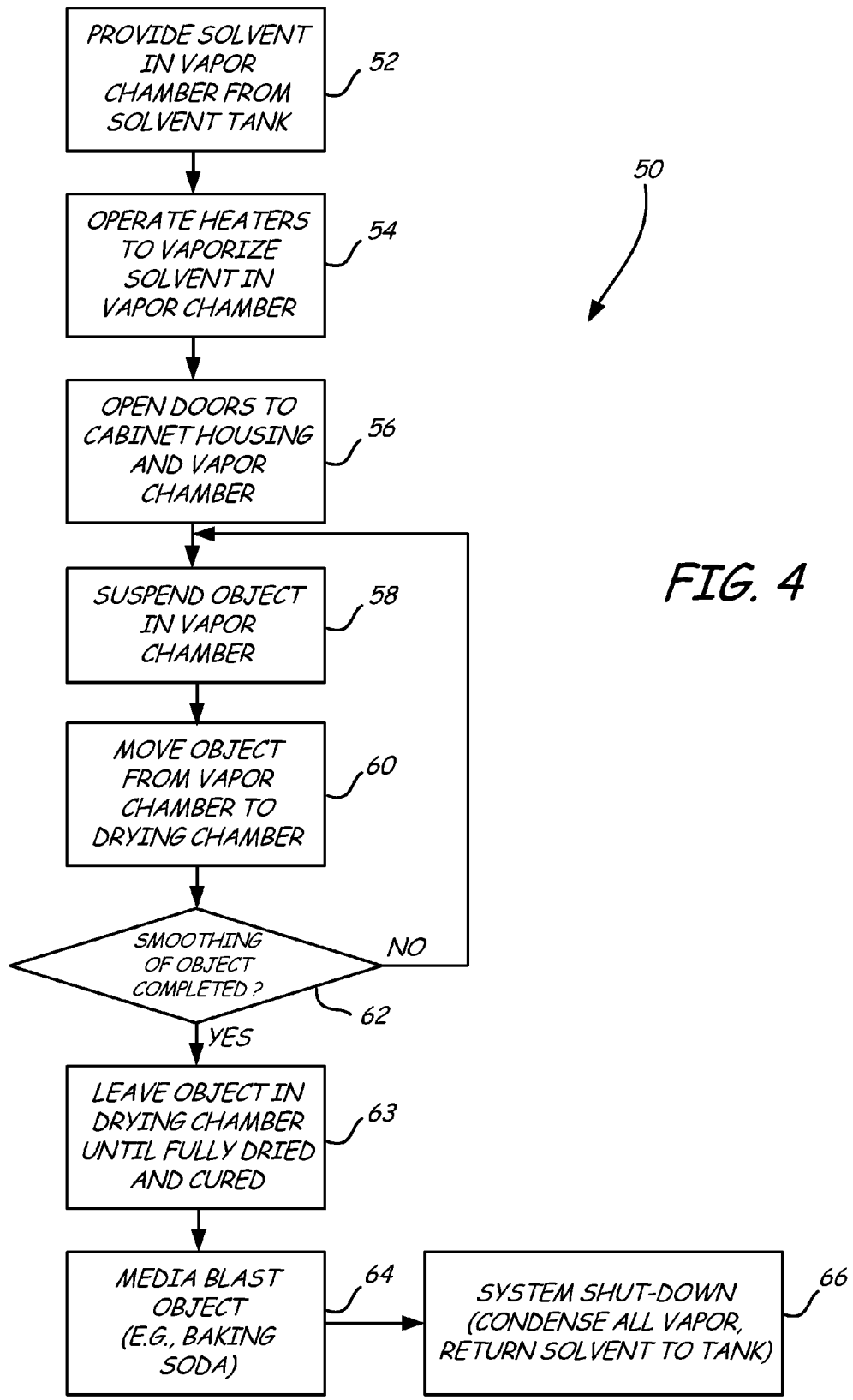
FIG. 4 is a flow diagram illustrating an exemplary method of vapor smoothing a rapid manufactured object according to an embodiment of the present invention.

FIG. 4 is a flow diagram illustrating exemplary method 50 of vapor smoothing a rapid manufactured object according to an embodiment of the present invention. Method 50 includes steps 52-66, and initially involves providing solvent 32 in vapor chamber 18 from solvent tank 24 located outside cabinet housing 12 (step 52). In an exemplary embodiment, this is performed under the control of a programmable logic controller (PLC) that operates to provide a precisely measured amount of solvent 32 through a valve (such as a ball valve or another type of valve) into vapor chamber 18, so as to maintain a fluid level of about 0.25 to 0.5 inches (0.63 to 1.27 centimeters), which in such embodiment is the minimum amount of boiling solvent required to fill vapor chamber 18 with solvent vapor. This low level of solvent 32 can be used and maintained due to the PLC continually and controllably providing solvent from solvent tank 24 as needed to maintain the desired minimum fluid level that will keep vapor chamber 18 filled with solvent vapor. Heaters 26, 28 and 29 are operated to vaporize solvent 32 in vapor chamber 19 (step 54). Door 14 is opened to allow access to interior 16 of cabinet housing 12, and door 21 is opened to allow access to the interior of vapor chamber 18 (step 56). In one embodiment, door 21 is air-powered (although it could be powered electrically or by other means) and is operated by foot-pedal control. The object to be vapor smoothed is then suspended in vapor chamber 18 (step 58). For many objects, suspension in vapor chamber 18 for up to about 30 seconds is all that is required for vapor to condense onto the object and reflow the outer surface material of the object to effect smoothing. After exposure of the object in vapor chamber 18, the object is moved from vapor chamber 18 to drying chamber 20, and door 21 is closed to reseal vapor chamber 18 (step 60).

During operation of surface finishing system 10, vapor in vapor chamber 18 is continually condensed onto primary cooling coils 30, and the distilled solvent is passed through a water separator and returned to solvent tank 24. The water separator both performs the water removal function and acts as a "plug" to ensure that vapor does not evaporate out of vapor chamber 18 during operation. In an exemplary embodiment, the distilled solvent (with water removed) is returned to the top of solvent tank 24, and solvent drawn from solvent tank 24 into vapor chamber 18 is taken from the bottom of solvent tank 24. This cycle of operation allows solvent to be reused and preserved to the extent possible, reducing the burden associated with disposal of solvent or solvent vapors that have been used.

After a cycle of exposing the object in vapor chamber 18 and drying the object in drying chamber 20, an operator determines whether smoothing of the object is complete (step 62). This determination may be made by observing the appearance of the object, by following a predetermined formula or procedure for a given type of object, or by another method. If smoothing is not complete, another exposure and drying cycle is performed. If smoothing is complete, after sufficient time to fully dry and cure the surface of the object (step 63), the object may be subjected to media blasting, such as with baking soda or another abrasive material (step 64). In one embodiment, the object is removed from cabinet housing 12 in order to media blast the object. In another embodiment, media blasting capability is provided in drying chamber 20, such as via a rotary mill, a vibratory process, or by manual blasting by an operator in drying chamber 20. Media blasting the object removes the sheen that is often present in rapid manufactured objects, providing an aesthetically pleasing satin finish to the object.

After use of surface finishing system 10 is complete, a shutdown process if performed (step 66), in which the vapor present in vapor chamber 18 is condensed, and the solvent may be returned to solvent tank 24. In an exemplary embodiment, condensing the vapor is achieved via operation of cold finger 42 (FIG. 2), which is connected to refrigeration compressor 22. In an exemplary shutdown sequence, the valve that connects solvent tank 24 to vapor chamber 18 is first closed, to stop the provision of solvent to vapor chamber 32. Then, all solvent remaining in vapor chamber 18 is vaporized and condensed onto primary cooling coils 30. Last, cold finger 42 is activated to attract and condense any remaining solvent vapor to the bottom of vapor chamber 18, and this solvent is returned to solvent tank 24 via a pump-based or gravity-based transport mechanism. The shutdown procedure is typically initiated by an operator, although the system may be programmed to automatically shut down after an extended period of inactivity under control of the system PLC.

The process of exposing an object to vapor in vapor chamber 18 and drying the object in drying chamber 20 may be repeated as many times as desired, to obtain a desired surface finish of the object. When the vapor smoothing process is complete, the "stair-step" features that are typically present in rapid manufactured objects will be significantly reduced or eliminated.

In some embodiments, it is desirable to precool the object to be vapor smoothed by placing it in drying chamber 20 before the initial exposure to solvent vapor in vapor chamber 18. This ensures that vapor is attracted to the object in vapor chamber 18, and that the reaction at the surface of the object occurs as desired.

Figure 5:
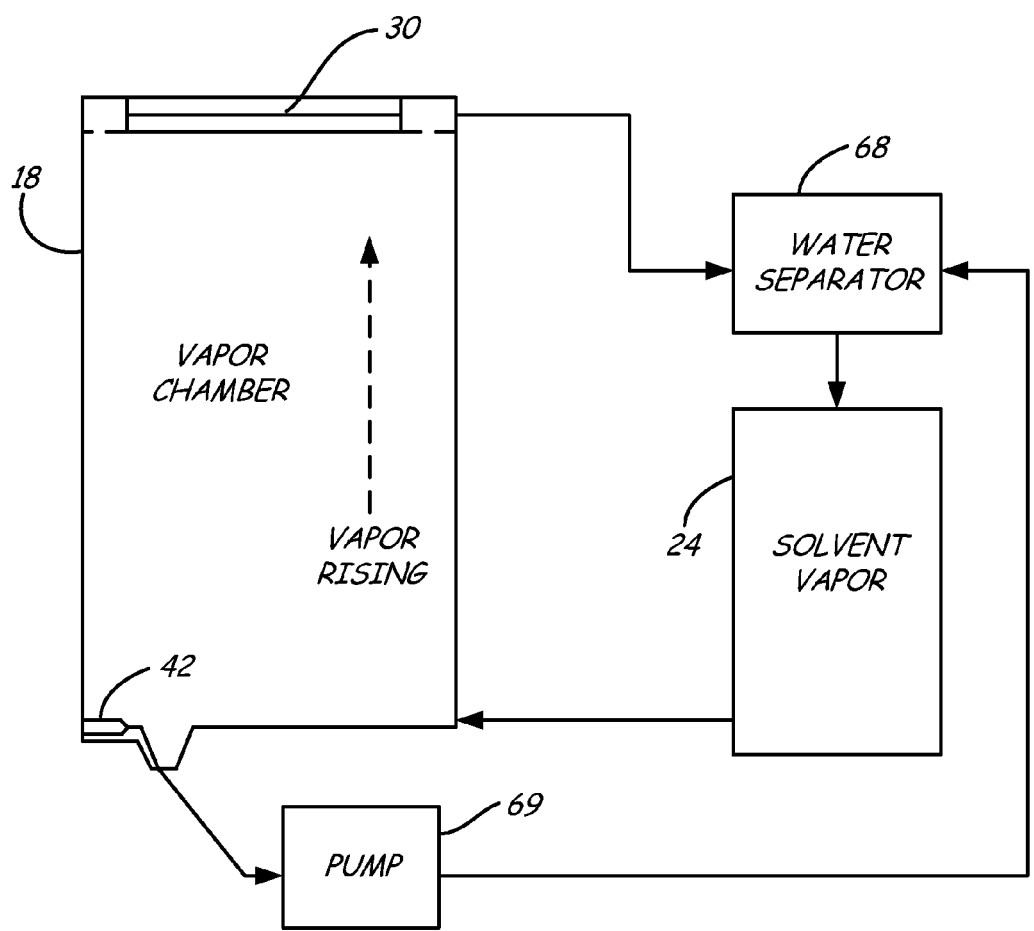
FIG. 5 is a diagram illustrating the recycling of solvent in the vapor smoothing surface finishing system of the present invention.

FIG. 5 is a diagram illustrating the recycling of solvent by surface finishing system 10. As discuss above, during operation of surface finishing system 10, vapor in vapor chamber 18 is continually condensed onto primary cooling coils 30, and the distilled solvent is passed through water separator 68 and returned to solvent tank 24. Solvent is also continually controlled to be provided from solvent tank 24 to vapor chamber 18 to maintain a desired fluid level in vapor chamber 18, to ensure that solvent vapor fills vapor chamber 18. This recycling of solvent continues until surface finishing system 10 is shut down. In a shutdown procedure, as discussed above, all remaining solvent in vapor chamber 18 is vaporized, and the solvent vapor is condensed on primary cooling coils 30 as in normal operation, and in addition cold finger 42 is activated to condense any remaining solvent vapor to the bottom of vapor chamber 18. This condensed solvent vapor is transported by pump 69 (or some other transport mechanism) through water separator 68 and back to solvent tank 24. Thus, the solvent may be recycled and reused for future operation of surface finishing system 10.

Figure 6:
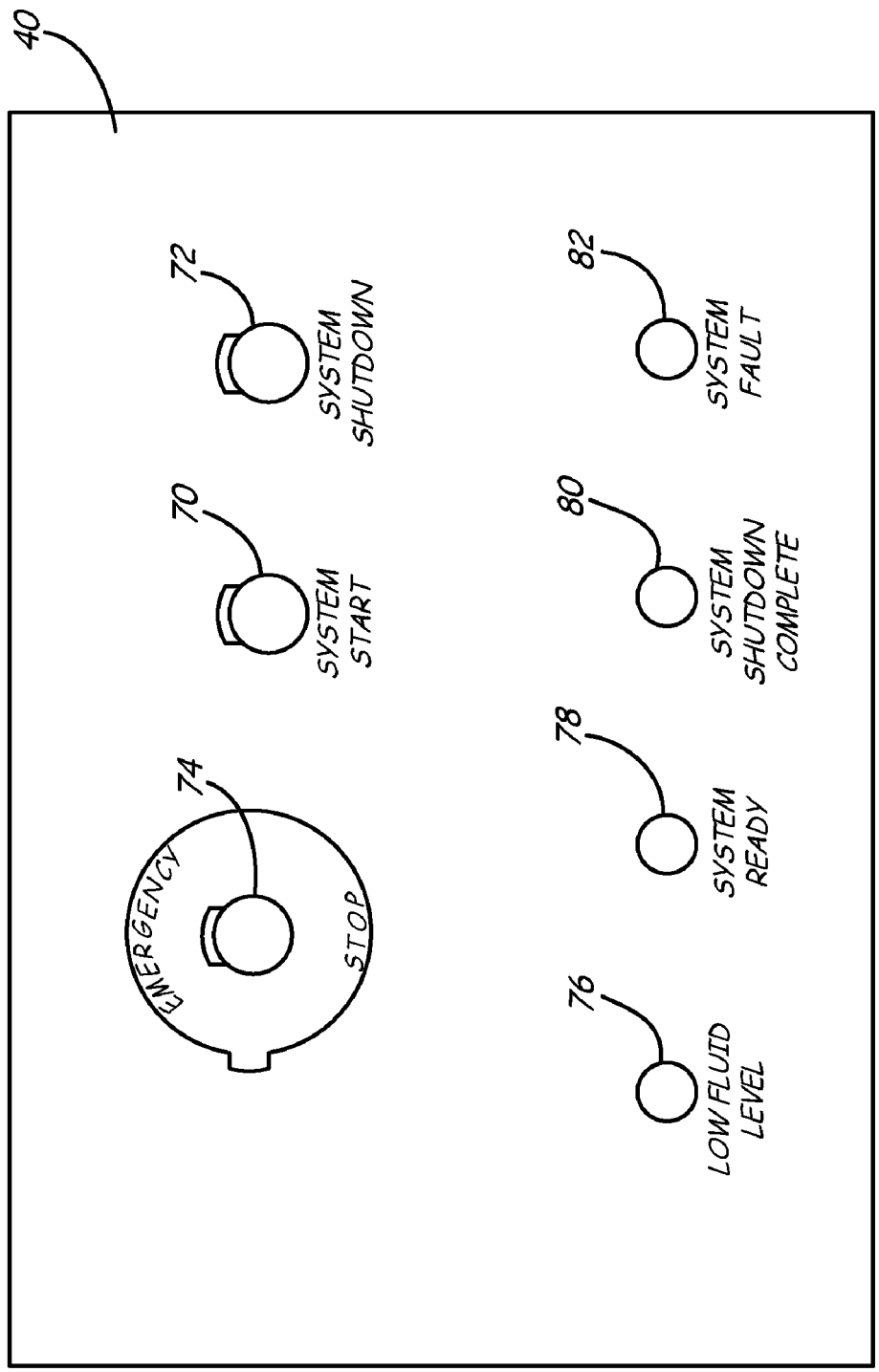
FIG. 6 is a diagram illustrating an exemplary control panel for use by an operator to control the operation of the surface finishing system.

FIG. 6 is a diagram illustrating exemplary control panel 40 for use by an operator to control the operation of surface finishing system 10. Control panel 40 includes system start button 70, system shutdown button 72, and emergency stop button 74, and also includes indicator lights for low fluid level (light 76), system ready status (light 78), system shutdown complete status (light 80), and system fault status (light 82). Pressing system start button 70 results in provision of solvent into vapor chamber 18 from solvent tank 24, and operating heaters 26, 28 and 29 to vaporize solvent 32 in vapor chamber 18. System ready status light 78 will illuminate when vapor chamber 18 reaches a temperature that is ready for an object to be vapor smoothed. After vapor smoothing is complete, an operator may press system shutdown button 72 to initiate a shutdown sequence, in which all of the vapor in vapor chamber 18 is condensed and returned to solvent tank 24 as described above.

Vapor smoothing surface finishing system 10 provides separated vapor chamber 18 and drying chamber 20 within the same cabinet housing 12. Vapor is contained within vapor chamber 18, and a small amount of solvent is used to form the vapor used for vapor smoothing of a rapid manufactured object. Plate 34 is provided at a higher elevation than the fluid level of solvent 32 in vapor chamber 18, to hide boiling solvent 32 and to protect against dropping of an object in solvent 32. These features assure operator safety in operation of vapor smoothing finishing system 10. Moreover, the small amount of solvent employed in vapor chamber 18 allows system 10 to be rapidly started up and shut down.

Drying chamber 20 is maintained at a temperature below room temperature, to ensure that the reaction of solvent vapor to the material of the object being smoothed is consistent and controlled. The difference between the temperature of the solvent vapor in vapor chamber 18 and the temperature of drying chamber 20 is preferably greater than 40° F. (22° C.) which may be achieved in some embodiments by maintaining drying chamber 20 at a temperature of no greater than 50° F. (10° C.).

Although the present invention has been described with reference to preferred embodiments, workers skilled in the art will recognize that changes may be made in form and detail without departing from the spirit and scope of the invention.

The invention claimed is:

1. A system for vapor smoothing a rapid manufactured three-dimensional object, the system comprising:
   a housing;
   a heatable vapor chamber located within the housing, and configured to contain a solvent that is vaporizable to fill the vapor chamber with vapor that is configured to soften and reflow material of the object while the object is exposed to the vapor, the heatable vapor chamber comprising:
      a first cooling component configured to define a first vapor ceiling for the heatable vapor chamber; and
      a vapor chamber top opening located above the first vapor ceiling;
   a drying chamber located within the interior of the housing and that is separate from the vapor chamber, the drying chamber being located laterally adjacent to the vapor chamber, wherein the drying chamber comprises a drying chamber top opening; and
   an interior chamber located within the housing above the vapor chamber and the drying chamber, the interior chamber being accessible to the vapor chamber top opening and to the drying chamber top opening, wherein the interior chamber comprises:
      a second cooling component configured to define a second vapor ceiling for the heatable vapor chamber and the drying chamber; and
      a interior chamber top opening located above the second vapor ceiling.

2. The system of claim 1, wherein the second cooling component is further configured to at least partially maintain the drying chamber at a temperature below room temperature.

3. The system of claim 1, wherein the first cooling component and the second cooling component each comprise cooling coils.

4. The system of claim 3, further comprising:
   a solvent tank located outside the vapor chamber connected to selectively provide solvent to the vapor chamber;
   a water separator operable to remove water from condensed solvent on the cooling coils; and
   a return line for returning the condensed solvent, having water removed therefrom, to the solvent tank.

5. The system of claim 1, further comprising:
a solvent tank located outside the vapor chamber; and
a transport mechanism configured to selectively provide the solvent from the solvent tank to the vapor chamber.

6. The system of claim 5, wherein the transport mechanism is configured to selectively provide the solvent to the vapor chamber in a manner that maintains a fluid level in the vapor chamber ranging from about 0.63 centimeters to about 1.27 centimeters.

7. The system of claim 5, further comprising a programmable logic controller (PLC) that controls provision of solvent from the solvent tank to the vapor chamber to maintain the fluid volume in the vapor chamber.

8. The system of claim 5, further comprising a cold finger in the vapor chamber operable to condense vapor in the vapor chamber, and a pump configured to return the condensed vapor to the solvent tank from the vapor chamber.

9. The system of claim 1, further comprising a vapor chamber door configured to selectively cover the vapor chamber top opening.

10. The system of claim 1, further comprising an exhaust vent connected to the drying chamber.

11. The system of claim 1, wherein the second cooling component is further configured to at least partially maintain the drying chamber at a temperature at least 40° F. lower than a temperature of the solvent vapor in the vapor chamber.

12. The system of claim 1, wherein the second cooling component is further configured to at least partially maintain the drying chamber at a temperature of no greater than 50° F.

13. The system of claim 1, further comprising an interior chamber door configured to selectively cover the interior chamber top opening.

14. A system for vapor smoothing a rapid manufactured three-dimensional object, the system comprising:
a housing;
a vapor chamber located within the housing, the vapor chamber comprising:
at least one heater configured to vaporize a solvent to provide a vapor that is configured to soften and reflow material of the object while the object is exposed to the vapor;
a first cooling component configured to define a first vapor ceiling for the vapor chamber; and
a vapor chamber top opening located above the first vapor ceiling;
a drying chamber located within the housing and that is separate from the vapor chamber, the drying chamber being located laterally adjacent to the vapor chamber, wherein the drying chamber comprises a drying chamber top opening; and
an interior chamber located within the housing above the vapor chamber and the drying chamber, the interior chamber being accessible to the vapor chamber top opening and to the drying chamber top opening, wherein the interior chamber comprises:
a second cooling component configured to define a second vapor ceiling for the vapor chamber and for the drying chamber; and
a interior chamber top opening located above the second vapor ceiling.

15. The system of claim 14, wherein the first cooling component and the second cooling component each comprise cooling coils.

16. The system of claim 15, further comprising:
a solvent tank located outside the vapor chamber connected to selectively provide solvent to the vapor chamber;
a water separator operable to remove water from condensed solvent on the cooling coils; and
a return line for returning the condensed solvent, having water removed therefrom, to the solvent tank.

17. The system of claim 14, further comprising:
a solvent tank located outside the vapor chamber; and
a transport mechanism configured to selectively provide the solvent from the solvent tank to the vapor chamber.

18. The system of claim 14, further comprising a vapor chamber door configured to selectively cover the vapor chamber top opening.

19. The system of claim 14, further comprising an interior chamber door configured to selectively cover the interior chamber top opening.

20. The system of claim 19, further comprising a vapor chamber door configured to selectively cover the vapor chamber top opening.

* * * * *

UNITED STATES PATENT AND TRADEMARK OFFICE
CERTIFICATE OF CORRECTION

PATENT NO. : 8,075,300 B2
APPLICATION NO. : 12/215929
DATED : December 13, 2011
INVENTOR(S) : Zinniel Page 1 of 1

It is certified that error appears in the above-identified patent and that said Letters Patent is hereby corrected as shown below:

In the Claims:

Column 7, Claim 11:

Line 25, after "F", delete ".".

Signed and Sealed this
Thirteenth Day of August, 2013

Teresa Stanek Rea
*Acting Director of the United States Patent and Trademark Office*